United States Patent [19]

Medwin

[11] 4,017,859
[45] Apr. 12, 1977

[54] MULTI-PATH SIGNAL ENHANCING APPARATUS

[75] Inventor: Herman Medwin, Pebble Beach, Calif.

[73] Assignee: The United States of America as represented by the Secretary of the Navy, Washington, D.C.

[22] Filed: Dec. 22, 1975

[21] Appl. No.: 643,047

[52] U.S. Cl. .................. 343/100 CL; 325/305; 325/476; 340/6 R

[51] Int. Cl.² .................. G01S 1/02; H04B 1/18

[58] Field of Search .......... 325/476, 305; 343/100 CL; 340/6 R, 16 M

[56] References Cited

UNITED STATES PATENTS

| | | | |
|---|---|---|---|
| 3,417,837 | 12/1968 | Flanagan | 340/3 R |
| 3,424,269 | 1/1969 | Schroeder | 340/3 R |
| 3,681,695 | 8/1972 | Cease et al. | 325/476 |

Primary Examiner—T.H. Tubbesing
Assistant Examiner—Richard E. Berger
Attorney, Agent, or Firm—Richard S. Sciascia; Paul N. Critchlow

[57] ABSTRACT

A plurality of processing channels each receive one of a number of direct and secondary signal energy rays. Each channel includes an A/D converter and computer the logic of which is controlled by a Fast Fourier Transform (FFT) algorithm to produce a plurality of data outputs each containing the amplitude and phase information of selected frequencies present in the channel input. To enhance signal detection and minimize signal strength fluctuations, each of the selected frequency outputs of each channel FFT is compared with each identical frequency output of other channel FFT's. Phase compensation means such as a shift register adjusts the phase relationship between all identical FFT outputs to permit their amplitudes to be constructively added. The individual subtotals so produced are totalled to provide an output representing the combined strength of the multi-path signal energy. In particular, medium interfaces such as an air-sea or air-ground interface, produce wide variations in the incoming direction of the signal energy to be detected.

5 Claims, 3 Drawing Figures

MULTI-PATH SIGNAL ENHANCING APPARATUS

BACKGROUND OF THE INVENTION

The present invention relates to signal detection apparatus and in particular, to processing apparatus for enhancing the strength of the received signal.

When an acoustic or electromagnetic wave travels through an air or water medium, it is refracted and scattered due to randomly-varying inhomogenities within the medium itself. Thus, both the phase and amplitude of the wave vary at the receiver even though the source may have constant output power and may be fixed in the medium. Further, due to the different paths travelled in reaching the receiver and the different directions from which the energy is received, the differing phases and amplitudes have a pronounced tendency to interfere destructively.

In the past, the multi-path interference problem has been partially solved by using a receiver with a narrow beam pattern which, in principle, selects the direction of the maximum energy input (the 'direct' ray) and minimizes responses from other directions ('secondary' rays). Frequency filters also have been widely used to improve the signal-to-noise ratio. In particular, with the advent of digital computers and the development of Fast Fourier Transforms (FFT) algorithms to determine the strength of a signal in the presence of noise, the filter band width has been narrowed to a limit which depends practically upon the breadth of the frequency variation of the fluctuating signal, as well as its amplitude.

As is known, the output of the FFT consists of a real and an imaginary component, or, in mathematical language:

$$P \text{ (pressure amplitude)} = a + ib \tag{1}$$

The output voltage of the signal then can be determined by the relationship:

$$V = k \, (P \, 2 + b^2)^{1/2} \tag{2}$$

Even so, it is to be noted that only the pressure amplitude, P, is detected and, that, in particular, this amplitude information is obtained only from one preferential direction. In other words, such techniques do not accept and make use of the excluded secondary rays provided by multi-path signals and, as is known, these secondary signals sometimes are as large as the direct signal rays.

It is therefore a primary object of the present invention to provide a system which utilizes the secondary rays to increase the strength of the signal and to decrease its fluctuation amplitude.

Another object is to utilize the previously-excluded phase information provided by the FFT to achieve the present purposes.

In general, these objects are achieved by providing separate channels for individually processing each of the multi-path waves or rays to provide amplitude and phase information for each frequency present in each wave and, subsequently, to adjust the relative phases of identical frequencies present in each channel to permit the amplitudes of all frequencies to be added constructively.

BRIEF DESCRIPTION OF THE DRAWINGS

The invention is illustrated in the accompanying drawings of which.

DETAILED DESCRIPTION OF THE INVENTION

Figure 1:
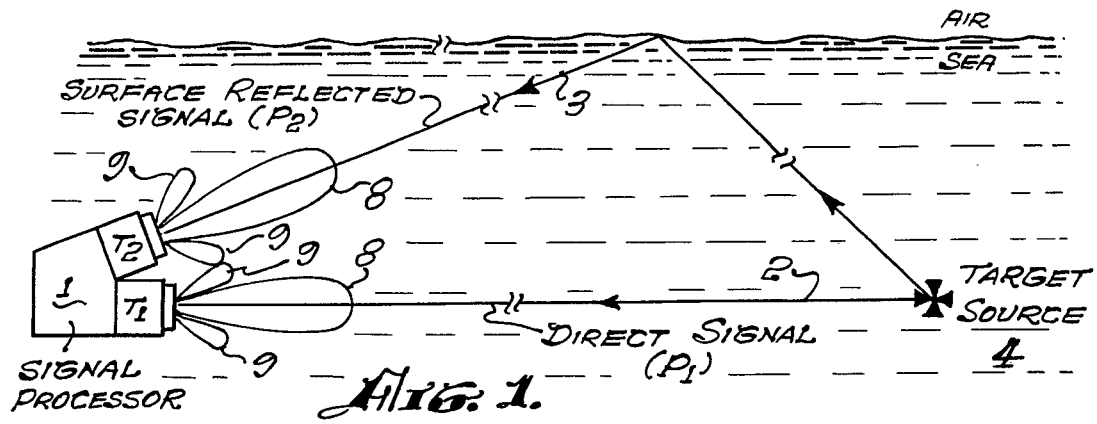
FIG. 1 is a schematic illustration of one intended use of the present system.

FIG. 1 simply illustrates a use in which the present signal processor 1 is deployed underwater to detect signal-wave energy in the form of rays 2 and 3 emanating from a target source 4. Ray 3, of course, represents the usual air-sea interface bounce or refraction which due to its phase difference can cancel or destructively interfere with the detection of the direct ray 2. In other words, if direct signal 2 which also is designated $P_1$ is nearly equal to and out-of-phase with secondary signal 3 ($P_2$), the two components virtually cancel so that the total detected strength of the signal ($V_{rms}$) becomes close to zero. Of course, due to the time-varying nature of the environment, this cancellation does not persist. Even so, the effect is one of producing large and undesirable amplitude fluctuations. As already indicated, the use of highly-directional, narrow-beam transducers or antennae, as well as frequency filters, has partially compensated for these difficulties by excluding $P_2$ from its receiver, although the exclusion is not always reliable and, of equal significance, the $V_{rms}$ output loses the signal strength component of $P_2$.

One feature of the present invention lies in its use of two or more directional, narrow-beam transducers 6 and 7 ($T_1$ and $T_2$) to simultaneously receive the signal components, $P_1$ and $P_2$. FIG. 1 shows the use of a pair of transducers having narrow-beam patterns formed of main and side lobes 8 and 9. These particular transducers are adjustably mounted to permit each of them to be scanned into a position of maximum signal strength as well as a position in which $T_1$ exclusively receives the direct signal and $T_2$ the secondary signal. This arrangement is used primarily for illustrative purposes. In actual practice, the same functional results can be obtained by using a single, segmented transducer which is electronically switched to form the desired pair or more of directional transducers. Any number of transducers can be used or any number of electronically-switched dispositions of a single, segmented transducer can be obtained. Electronically steerable transducer or antenna arrays, of course, are well-known and widely used. It also should be understood at this point that the present system is applicable both to acoustic and electromagnetic signals and that the same direct and secondary wave phenonmenon is present regardless of the transmissive medium.

Figure 2:
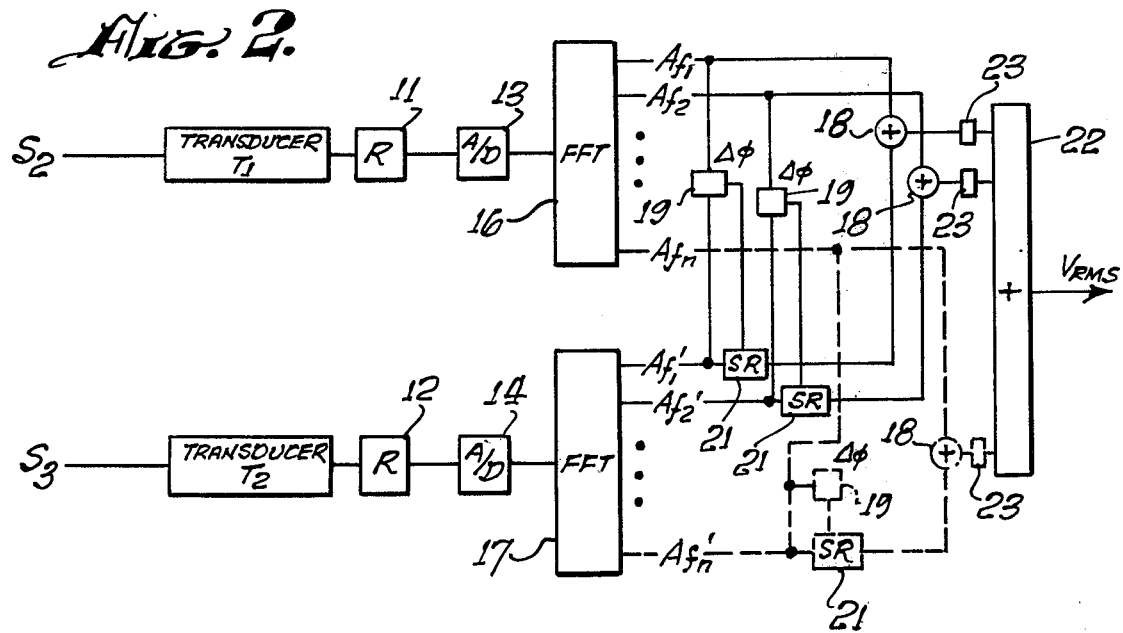
FIG. 2 is a block diagram of the present processor adapted for constructively adding a pair of multi-path signal waves.

The purpose of using multiple, or steerable transducing beams is to permit each received direct and secondary signal to be constructively added one to the other to provide a total V output representing the combined strength ($P_1 + P_2$) rather than simply $P_1$ or $P_2$. Signal processor 1 achieves this purpose by use of the processing system shown in block form in FIG. 2. Referring to FIG. 2, it will be seen that direct and secondary signals 2 and 3 each are received separately by transducers $T_1$ and $T_2$ and applied to separate receivers 11 and 12 the outputs of which are converted into digital form by analog-to-digital converters 13 and 14 for application to FFT computers 16 and 17. For descriptive purposes, it can be considered that each of the signals $S_2$ and $S_3$ are separately processed in individual 'channels' the outputs of which are the digital information outputs of the FFT computers.

Receivers 11 and 12 may be any conventional amplifying component consistent with the functional purposes of the processing channels which, as will be described, are to produce by use of the FFT computers amplitude and phase information for each frequency of interest. Obviously, the analog output of the receivers must be digitized by the A/D converters which, again, are entirely conventional.

The Fourier Series and Transforms, of course, are widely-used for a variety of purposes and, as already indicated, Fast Fourier Transform (FFT) computer algorithms have been used for detection purposes. Thus, it is considered common practice in detection systems to use the FFT's to provide amplitude and phase information of each frequency of interest being processed. However, as far as is known, the phase information of the FFT's previously has been discarded at least to the extent that it has not been used for the present split-beam frequency components to permit constructive adding.

As indicated in FIG. 2, each FFT computer produces data identified as $Af_1$–$Af_n$ and $A^1f_1$–$A^1f_n$ in which $Af_1$ for example, includes the amplitude and phase of one of $n$ frequencies of interest in the channel of FFT 16. The frequencies of interest obviously will depend upon the particular intended use or application of the system as a whole. For example, these uses can extend to either active sonar or radar or simply be concerned with passive listening. For active sonar, the frequencies of interest may be rather well-defined by the carrier frequency although reflected returns may include a number of frequency variations which, if detected and constructively added in the manner to be described, significantly increase the total $V_{rms}$ and minimize fluctuations. Passive listening devices should receive and process a rather wide range of frequencies varying in a submersible target from a low frequency target hull signal to the relatively high frequencies of propulsion components, such as the generator. The present frequencies of interest $Af_{1-n}$ and $A^1f_{1-n}$ manifestly are to be selected according to these recognized criteria and the system components conformed to the application. For example, the receivers should have an appropriate frequency band and, as a practical matter, the FFT's outputs will be restricted to the so-called frequencies of interest.

As will be noted, the arrangement is such that the series of outputs $Af_{1-n}$ includes frequencies which are identical to the series $A^1f_{1-n}$. The subsequent processing of these outputs then involves a phase adjustment of each frequencies of the series with an identical frequency of the other series. The phase-compensated frequencies then can be constructively added. In particular, as will be noted, output $Af_1$ of FFT 16 is coupled to a binary adder 18 to which identical output $Af^1$ of FFT 17 also is coupled. Further, as shown, other identical frequency outputs of FFT's 16 and 17 are applied in the same manner to identical adders 18 which, of course, may be implemented by a single component capable of performing all the requisite additions. The phase compensation is achieved by conventional shift registers 21 which are controlled by the phase difference between, for example, $Af_1$ and $A^1f_1$. As known, each FFT output includes the previously-discarded phase information $$\phi = \tan^{-1}(b/a)$$

so that the phases of $Af_{1-n}$ and $A^1f_{1-n}$ can be compared to control the shift registers. Phase detectors 19 can be used for this purpose.

Since the effect of phase detection and phase shift is to bring into identical phase the two or more outputs such as $Af_1$ of FFT 16 and $Af_1^1$ of FFT 17 an alternative to the phase shifting operation is to simply add the amplitudes of the two or more contributions of a given frequency independent of phase.

The totalled $V^2$ can be achieved by employing detectors 23 for squaring the amplitude for each frequency represented by the subtotal adders 18, and adding these squared terms for all frequencies in an adder 22.

Figure 3:
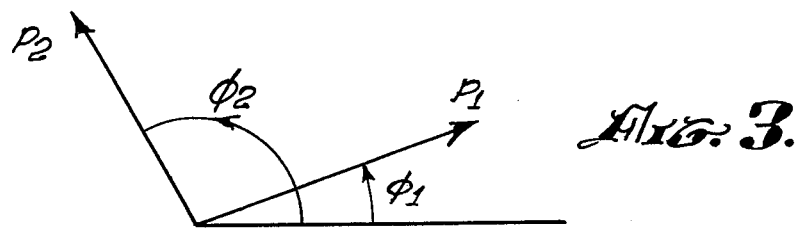
FIG. 3 is phasor diagram illustrating the phase separation in the pressure amplitudes of a pair of direct and secondary signals.

It also is to be noted that the direct and secondary signals can be completely defined by equations and by their phasor diagram such as is provided by FIG. 3. With reference to the diagram, it will be apparent that:

$$p_1 = P_1 \cos(\omega t - \phi_1)$$

$$p_2 = P_2 \cos(\omega t - \phi_2)$$

where $$P_1 = (a_1^{2\,2} + b_1^2)^{1/2}$$

$$\phi_1 = \tan^{-1}(b_1/a_1)$$

and $$P_2 = (a_2^2 = b_2^2)^{1/2}$$

$$\phi_2 = \tan^{-1}(b_2/a_2) \tag{4}$$

In general, for long range detection of signals, the phases and their difference, $\phi_2 - \phi_1$, as well as the amplitudes, $P_1$ and $P_2$, fluctuate. If now the amplitudes of the FFT outputs are added in phase the total pressure will be $$p = (P_1 + P_2) \cos \omega t \tag{5}$$

and the rms output voltage of the total signal will be $$V_{rms} = k \, (P_1^2 \text{ rms} + P_2^2 + 2P_1 \text{ rms } P_2 \text{ rms})^{1/2} \tag{6}$$

The output given by phase adjusted split beams (Eq 6) should be compared with the magnitude for segmented transducers using power addition without phase-correction, a technique that has been known for many years, which gives the smaller response $$V_{rms} = k \, (P_1^2 \text{ rms} + P_2^2 \text{ rms})^{1/2} \tag{7}$$

The improvement in signal strength is substantial when the two signals are approximately equal. A very large advantage accrues over the non-segmented single receiver when the secondary signal is out of phase with the direct ray and nearly equal to it.

Under that condition, which may occur for example when a single transducer receives the direct signal and a nearly-equal, out-of-phase, signal scattered from the surface, the two components $P_1$ and $P_2$ will virtually cancel so that $V_{rms}$ would be close to zero. Because of the time-varying nature of the environment, this cancellation could not persist, and large fluctuations would occur, in practice.

With the present system, the surface reflected ray is phase shifted so that, when combined with the direct ray, almost a doubling of pressure would occur. Consequently, the received voltage would be almost 6 dB greater than if only the direct ray had been received by a narrow beam transducer that had excluded the surface energy.

In addition to the foregoing advantages, the present systems also will be found to provide valuable informational outputs other than the principal $V_{rms}$ output. Thus, the phase difference output of components 19 can be used in a well-known manner to derive target range information. Also, the amplitudes of the individual frequency outputs of the FFT's can be used singly or in their added form to assist in target classification.

Obviously many modifications and variations of the present invention are possible in the light of the above teachings. It is therefore to be understood that within the scope of the appended claims the invention may be practiced otherwise than as specifically described.

I claim:
1. Signal-processing apparatus for enhancing the signal strength of multi-path signals derived from a signal source, comprising:
a signal-processing channel for each of said derived multi-path signals, each channel including:
a directional signal-energy transducer,
a signal-processing receiver coupled to the transducer output,
an A/D converter for said receiver output, and
a FFT digital computer coupled to said converter, said computer providing a plurality of data outputs each containing the amplitude and phase information of each of a plural number of frequencies present in said signal energy,
means for constructively adding in-phase the amplitude information of each identical frequency present in each of said channels, and
means coupled to said adding means for totalling the adder outputs for providing an output representative of the combined signal strength of fluctuating multi-path signal energy.

2. The apparatus of claim 1 wherein said means for constructively adding said amplitude information includes:
adding means for each identical frequency of said computer outputs,
circuit means coupling each identical frequency output to said adding means, and
phase-compensating means associated with said circuit means for permitting said in-phase addition.

3. The apparatus of claim 2 wherein said phase-compensating means includes:
a shift-register, and
a phase detector.

4. The apparatus of claim 3 wherein said signal-energy transducer of each channel is adapted for exclusively receiving and transducing a narrow beam of signal energy arriving at the transducer from a particular direction.

5. The apparatus of claim 4 wherein said means for constructively adding said amplitude information includes:
adding means for each identical frequency of said computer outputs,
circuit means coupling each identical frequency output to said adding means, and
phase-compensating means associated with said circuit means for permitting said in-phase addition.

* * * * *